United States Patent [19]

Aikawa et al.

[11] Patent Number: 5,459,815
[45] Date of Patent: Oct. 17, 1995

[54] SPEECH RECOGNITION METHOD USING TIME-FREQUENCY MASKING MECHANISM

[75] Inventors: Kiyoaki Aikawa; Hideki Kawahara; Yoh'ichi Tohkura, all of Kyoto, Japan

[73] Assignee: ATR Auditory and Visual Perception Research Laboratories, Kyoto, Japan

[21] Appl. No.: 79,425

[22] Filed: Jun. 21, 1993

[30] Foreign Application Priority Data

Jun. 25, 1992 [JP] Japan ................................. 4-167832

[51] Int. Cl.$^6$ ..................................................... G10L 5/06
[52] U.S. Cl. ........................ 395/2.63; 395/2.47; 395/2.52
[58] Field of Search ................. 381/42, 50; 395/2.4–2.63

[56] References Cited

U.S. PATENT DOCUMENTS

| | | | |
|---|---|---|---|
| 4,956,865 | 9/1990 | Lennig et al. | 381/43 |
| 5,067,158 | 11/1991 | Arjmand | 381/51 |
| 5,097,510 | 3/1992 | Graupe | 381/47 |
| 5,202,926 | 4/1993 | Miki | 381/36 |
| 5,268,685 | 12/1993 | Fujiwara | 341/76 |

FOREIGN PATENT DOCUMENTS 0290190  11/1988  European Pat. Off. .

OTHER PUBLICATIONS

S. Furui, "Speaker–Independent Isolated Word Recognition Using Dynamic Features of Speech Spectrum", IEEE Trans., ASSP–34, No. 1, pp. 52–59, (1986–2).

D. Klatt, "Prediction of Perceived Phonetic Distance from Critical–Band Spectra: A First Step", Proc. ICASSP82, pp. 1278–1281, (May 1982).

B. Hanson et al., "Spectral Slope Distance Measures with Liner Prediction Analysis for Word Recognition in Noise", IEEE Trans. ASSP–35, No. 7, pp. 968–973, (Jul. 1987).

K. Aikawa et al., "Spectral Movement Function and Its Application to Speech Recognition", Proc. ICASSP88, 223–226, (Apr. 1988).

E. Miyasaka, "Spatio–Temporal Characteristics of Masking of Brief Test–Tone Pulses by a Tone–Burst with Abrupt Switching Transients", vol. 39, No. 9, pp. 614–623, (1983).

J. Markel et al., "Linear Prediction of Speech", Spriinger–Verlag (1976).

Y. Linde et al., "An Algorithm for Vector Quantizer Design", IEEE Transactions on Communications, vol. Com–28, No. 1, pp. 84–95 (1980).

L. Baum, "An Inequality and Associated Maximization Technique in Statistical Estimation for Probabilistic Functions of Markov Processes", 3, pp. 1–8, (1972).

P. Brown, "The Acoustic–Modeling Problem in Automatic Speech Recognition", Ph. D. thesis, Carnegie–Mellon University (1987).

H. Sakoe et al., "Dynamic Programming Algorithm Optimization for Spoken Word Recognition", IEEE Trans. on Acoustics. Speech, and Signal Processing, vol. ASSp–26, No. 1, (1978–Feb.).

Lee et al, "An Overview of the Sphinx Speech Recognition System" IEEE Trans. on Accoustics, Speech, and Signal Processing vol. 38, No. 1, Jan. 1990, pp. 35–45.

*Primary Examiner*—Allen R. MacDonald
*Assistant Examiner*—Thomas Onka
*Attorney, Agent, or Firm*—Lowe, Price, LeBlanc & Becker

[57] ABSTRACT

A speech recognition method in which input speech signals are converted to digital signals and then time sequentially converted to cepstrum coefficients or logarithmic spectra. Dynamic spectrum time sequence is obtained by time frequency filtering of cepstrum coefficients, or masked spectrum time sequence is obtained by time frequency masking of the logarithmic vector time sequence. Based on the dynamic cepstrum time sequence or masked spectrum time sequence obtained in this manner, speech is recognized.

13 Claims, 3 Drawing Sheets

SPEECH RECOGNITION METHOD USING TIME-FREQUENCY MASKING MECHANISM

BACKGROUND OF THE INVENTION

1. Field of the Invention

The present invention relates to a speech recognition method. More specifically, the present invention relates to a speech recognition method in which automatic speech recognition by a machine such as electronic computer is effected by using distance or probability between an input speech spectrum time sequence and a template speech spectrum time sequence or its statistical model.

2. Description of the Background Art

Basically, in automatic speech recognition by an electronic computer or the like, the speech is converted to a spectrum time sequence and recognized. Cepstrum is often used as a feature parameter representing the spectrum. The cepstrum is defined as an inverse Fourier transform of the logarithmic spectrum. In the following, logarithmic spectrum will be simply referred to as a spectrum.

Recently, it has been reported that the reliability of speech recognition can be improved if a change of the spectrum in time or on a frequency axis is used as a feature together with the spectrum. Proposed are "delta cepstrum" utilizing time change of the spectrum [Sadaoki Furui: "Speaker-Independent Isolated Word Recognition Using Dynamic Features of Speech Spectrum," IEEE Trans., ASSP-34, No. 1, pp. 52–59, (1986–2).]; a "spectral slope" utilizing frequency change of the spectrum [D. H. Klatt: "Prediction of Perceived Phonetic Distance from Critical-Band Spectra: A First Step," Proc. ICASSP82 (International Conference on Acoustics Speech and Signal Processing), pp. 1278–1281, (May, 1982), Brian A. Hanson and Hisashi Wakita: "Spectral Slope Distance Measures with Linear Prediction Analysis for Word Recognition in Noise," IEEE Trans. ASSP-35, No. 7, pp. 968–973, (Jul., 1987)]; and "spectral movement function" capturing the movement of formant [Kiyoaki Aikawa and Sadaoki Furui: "Spectral Movement Function and its Application to Speech Recognition," Proc. ICASSP88, pp. 223–226, (Apr., 1988)].

"Delta cepstrum" is based on a time-derivative of the logarithmic spectrum time sequence and calculated by a time filter which does not depend on frequency. "Spectral slope" is based on frequency-derivative of the logarithmic spectrum and is calculated by a frequency filter not dependent on time. "Spectral movement function" is based on a time-frequency-derivative of the logarithmic spectrum and is calculated by operations of both the time filter and the frequency filter. Here, the frequency filter is constant regardless of time, and the time filter is constant for every frequency. The time filter addresses fluctuation of the spectrum on the time axis, while the frequency filter addresses fluctuation of the spectrum on the frequency axis.

However, a feature extraction mechanism of the human auditory system is considered to be different from any of these filters. The human auditory system has a masking effect. In a two dimensional spectrum on a time frequency plane, a speech signal of a certain frequency at a certain time point is masked by a speech signal which is close in time and in frequency. In other words, it is inhibited. As for the masking effect, when the speech at a certain time point masks a speech succeeding in time, this effect is referred to as forward masking. We can consider that forward masking serves to store the spectral shape of a preceding time point, and therefore we can assume that a dynamic feature not included in the preceding speech is extracted by this effect. According to an auditory-psychological study, frequency pattern of forward masking becomes smoother when a time interval between the masking sound and the masked sound (masker-signal time-interval) becomes longer [Eiichi Miyasaka, "Spatio-Temporal Characteristics of Masking of Brief Test-Tone Pulses by a Tone-Burst with Abrupt Switching Transients," J. Acoust. Soc. Jpn, Vol. 39, No. 9, pp. 614–623, 1983 (in Japanese)]. This masked speech is the effective speech perceived in the human auditory system. This signal processing mechanism can not be realized by a fixed frequency filter which is not dependent on time. In order to implement this signal processing mechanism, it is necessary to use a set of frequency filters the characteristics of which change dependent on time. The set of frequency filters have their characteristics as spectrum smoothing filters changed dependent on the time-interval from reception of the speech serving as a masker, and operation related to frequency is dependent on time. A mechanism for extracting feature parameters taking into consideration such auditory characteristics has not yet been reported.

SUMMARY OF THE INVENTION

Therefore, an object of the present invention is to provide a method of speech recognition which can improve reliability of automatic speech recognition by a machine, in which a spectrum time sequence closer to the actual spectrum time sequence perceived by a human being as compared with the conventional techniques, by using a spectrum smoothing filter having filtering characteristics dependent on time duration, simulating time frequency characteristics of forward masking.

The present invention provides a speech recognition system in which input speech is converted to a time sequence of a feature vector such as spectrum or cepstrum, that is, spectra are obtained periodically. The time when a spectrum is obtained is called a time point and distance or probability of model between the resulting time sequence and a time sequence of a template spectrum feature vector, or its statistical model, is calculated for recognition. A set of frequency filters in which frequency smoothing is promoted as the time is traced back, including the promotion being stopped at a certain time period traced back, or a frequency filter having the above described mechanism described as a function of time, is provided in the spectrum time sequence to smooth the preceding spectrum. Alternatively an operation equivalent thereto is carried out on the feature vector. A masking pattern is obtained, by accumulating preceding smoothed spectra from a certain time point in the past to immediately before the present time, or an equivalent operation is performed on the feature vector. A masked spectrum is obtained, by a certain operation between the spectrum at the present time and the masking pattern. An equivalent operation is carried out between the feature vector representing spectrum and a feature vector representing the masked spectrum. The masked spectrum or a feature vector time sequence equivalent thereto which is obtained by the above described operation carried out at every time point is used for recognition.

In the speech recognition method in accordance with the present invention, a dynamic feature such as observed in the masking characteristics of human auditory system can be extracted. More specifically, a feature which has not appeared so far is emphasized while a feature which has continuously appeared is suppressed. Since the preceding spectra are smoothed to be added to the masking pattern, the masking pattern has come to represent a global feature of preceding speech input, and the change therefrom represents the feature at each time point. By this method, the dynamic feature important in speech recognition can be extracted and, in addition, influence of stationary spectral tilt dependent on individuality included in the speech or of transmission characteristic in the speech signal transmitting system can be reduced. The delta cepstrum which is a dynamic feature parameter and conventionally used does not have information of a spectral shape, and therefore it must be used with other parameters such as cepstrum. However, since the dynamic cepstrum includes both instantaneous and transitional features of a spectrum, it is not necessary to use it with other parameters. Further, by using such a time frequency masking mechanism, a dynamic feature can be obtained based on the preceding smoothed spectrum, and therefore the dynamic feature can be extracted with less influence of detailed formant structure of the preceding phoneme.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First, the principle of the present invention will be described. In this invention, speech is converted to a time sequence of cepstrum coefficients. The cepstrum can be easily calculated by using linear predictive coding analysis (LPC) [J. D. Markel and A. H. Gray, Jr., "Linear Prediction of Speech", Springer-Verlag (Berlin Heidelberg New York, 1976)]. The operation for frequency smoothing the spectrum means calculating convolution of the spectrum and the smoothing filter on the frequency axis, and it is equivalently done by multiplying a cepstrum vector and a cepstral lifter. A cepstrum vector is calculated by inverse Fourier transform of the log spectrum. A cepstral lifter is calculated by inverse Fourier transform of the smoothing filter. Let us represent the k-th order cepstrum coefficient of the speech at the time point i as $c_k(i)$. When the k-th order coefficient of the lifter for smoothing the spectrum n time point before is represented as $l_k(n)$, the k-th order cepstrum expansion coefficient $m_k(i)$ of the masking pattern at the present time i can be represented as a total sum of the speech cepstrum weighted by the lifter for preceding N time points, by the following equation (1):

$$m_k(i) = \sum_{n=1}^{N} c_k(i-n) l_k(n) \qquad (1)$$

N represents maximum time period in which masking is effective. The masked effective speech spectrum can be obtained by subtracting the masking pattern from the spectrum at present, and in the cepstral domain, the cepstrum expansion coefficient of the k-th order of the masked effective spectrum can be obtained by subtracting the cepstrum expansion coefficient of the masking pattern from the cepstrum at present, as represented by the following equation (2):

$$b_k(i) = c_k(i) - m_k(i) \qquad (2)$$

This parameter is referred to as a "dynamic cepstrum."

The pass band of the frequency smoothing lifter $l_k(n)$ used herein is adapted to be narrower as the time n is further traced back from the present time, with the quefrency of 0th order being the center. In a first embodiment, a rectangular window is used for the shape of the lifter, which is represented by the following equation (3):

$$l_k(n) = \begin{cases} \alpha \beta^{n-1} & |k| \leq q_0 - \nu(n-1) \\ 0 & \text{otherwise} \end{cases} \qquad (3)$$

Here, $q_0$ represents cutoff quefrency one time point before the present, and $\nu$ represents the rate of narrowing of the quefrency pass band at every advance of time by one frame. The influence of the preceding speech as a masking pattern on the present speech decays exponentially, with the initial masking decay rate being $0<\alpha<1$ and medial masking decay rate being $0<\beta<1$.

A time sequence of dynamic cepstrum is generated by the above described operation carried out successively for the speech at respective time points from the past. Speech recognition is carried out by using the time sequence of the produced dynamic cepstrum series. The recognition method may employ template matching using dynamic programming, DTW (Dynamic Time-Warping) or HMM (Hidden Markov Model). Since the dynamic cepstrum is obtained from the speech spectra of the past and present and does not use future spectrum, it is convenient also for a speech recognition apparatus carrying out time-synchronous processing. The embodiments in accordance with the principle will be described in the following.

Figure 1:
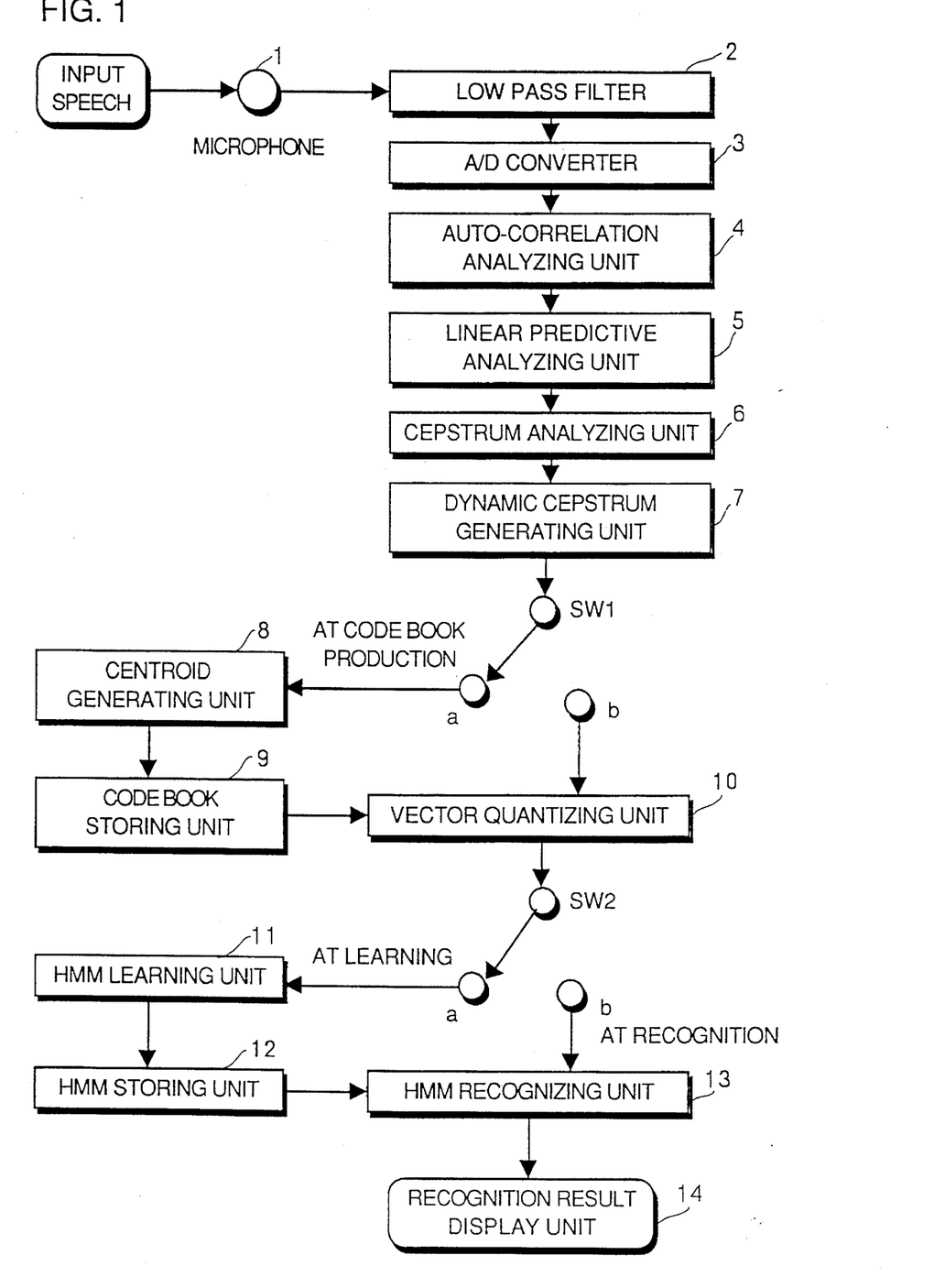
FIG. 1 is a block diagram showing a structure of one embodiment of the present invention.

FIG. 1 is a block diagram of a first embodiment of the present invention. Input speech is converted to an electric signal, its frequency component not lower than the ½ of the sampling frequency is removed by a low pass filter 2, and the signal is applied to an A/D converter 3. A/D converter 3 has a sampling frequency, for example, of 12 kHz and a quantization level of 16 bits, and by this converter, the signal is converted to a digital signal. The digital signal is applied to an auto-correlation analyzing unit 4, a sequence of speech segment are produced using a Hamming window having the width of 30 msec at every 10 msec, and auto-correlation coefficients from first to 16th order are calculated. In this case the time point interal is 10 msec. A linear predictive coefficient analyzing unit 5 calculates linear predictive coefficients of first to 16th order from the auto-correlation coefficients, and a cepstrum analyzing unit 6 calculates cepstrum coefficients of first to 16th order. Meanwhile, before linear predictive analysis, pre-emphasizing for emphasizing high frequency component of the speech is effected by performing, for example, a differential filtering on the speech wave.

A dynamic cepstrum generating unit 7 provides a time frequency masking on the cepstrum time sequence to obtain a time sequence of dynamic cepstrum. Respective coefficients of the masking lifter are set to $q_0=7$, $\alpha=0.25$, $\beta=0.5$, $\nu=1$ and $N=4$. The coefficients of the masking lifter of k-th order at the time delay of n are as shown in Table 1 below.

TABLE 1

Coefficients of Square Spectrum Smoothing Lifter

| Order | Time Delay | | | | |
|---|---|---|---|---|---|
| | 1 | 2 | 3 | 4 | 5 |
| 1 | 0.25 | 0.125 | 0.0625 | 0.0313 | 0 |
| 2 | 0.25 | 0.125 | 0.0625 | 0.0131 | 0 |
| 3 | 0.25 | 0.125 | 0.0625 | 0.0313 | 0 |
| 4 | 0.25 | 0.125 | 0.0625 | 0.0313 | 0 |
| 5 | 0.25 | 0.125 | 0.0625 | 0 | |
| 6 | 0.25 | 0.125 | 0 | | |
| 7 | 0.25 | 0 | | | |
| : | 0 | | | | |
| 16 | 0 | | | | |

In this embodiment, a discrete HMM using an output probability of a representative vector code is used, and therefore a step of vector quantization is necessary [Y. Linde, A. Buzo, and R. M. Gray, "An algorithm for vector quantizer design," IEEE Trans. Commun., vol. COM-28, pp.84–95, (Jan-1980)].

A switch SW1 is switched for obtaining representative points of a vector, that is, a centroid, from a number of the samples of feature vector in a prescribed time period. When switch SW1 is switched to the "a" side, a number of samples of the dynamic cepstrum obtained in the dynamic cepstrum generating unit 7 are applied to a centroid generating unit 8, and centroid vectors of 256 dynamic cepstra can be obtained by vector quantization. Centroid vectors are stored in a codebook storing unit 9. When switch SW1 is switched to the "b" side, a vector quantizing unit 10 assigns a centroid vector closest to respective vectors of the dynamic cepstrum time sequence of the speech by using about 256 centroid vectors stored in the codebook storing unit 9, and the speech is represented by a sequence of vector code number. Closeness between the centroid and each vector can be measured by a measure such as Euclidean distance.

A switch SW2 is for switching between HMM learning and recognition of test speech. When it is switched to the "a" side, a number of phoneme training samples are collected in an HMM training unit 11, and learned in accordance with Baum-Welch learning algorithm [L. E. Baum, "An Inequality and Associated Maximization Technique in Statistical Estimation for Probabilistic Functions of a Markov Process," Inequalities, 3, pp.–8, 1972]. As the embodiment 1 is directed to an apparatus for recognizing phonemes, HMM learns on a phoneme by phoneme basis. For example, HMM for recognizing the phoneme /b/ is learned from a number of samples of /b/. The phoneme training sample is a sequence of vector codes. The length of sequence is variable. A typical 4-state 3-loop HMM, for example, is used for representing a phoneme. The obtained HMM is stored in an HMM storing unit 12. Such HMMs are prepared corresponding to categories to be recognized. At the time of recognition, switch SW2 is switched to the "b" side, and the sequence of vector codes of the testing speech is recognized by the HMMs at an HMM recognizing unit 13. There is a table of probability (output probability) of centroid numbers (vector codes) for each state (a code 1 at state 1 is described, for example, as having a probability of 0.01), and the table is learned based on the set of training speeches. Probability of transition from one state to another is also learned.

In HMM recognizing unit 13, an HMM model of /b/, an HMM model of /d/ and so on are successively examined for an input speech represented as a time sequence of vector codes, and probability of generation of vector code time sequence of the input speech is calculated. It may be unnecessary to describe in detail the recognition method using HMM, as it is well known. In summary, a method of calculating probability of one HMM with respect to the input speech is as follows. Every possible assignment without tracing back of time of HMM states is carried out for the vector code time sequence of the input speech, the generation probability of the vector code is multiplied by a state transition probability, and the logarithm of the results are accumulated to obtain a probability indicative of the distance between the model and the input speech. Such probabilities of several HMM models such as /b/, /d/ and the like are calculated, and the model having the highest probability is regarded as the result of recognition, and the result is displayed on a recognition result display unit 14.

The result provided by one embodiment of the present invention was confirmed by an experiment of recognizing 6 phonemes /b, d, g, m, n, N/ using HMMs. Phoneme samples used for learning were extracted from 2640 Japanese important words uttered by one male. Phoneme samples used for testing were extracted from different 2640 important words uttered by the same person. According to the result of recognition experiment, recognition rate, which had been 84.1% when conventional cepstrum coefficients had been used as feature parameters, could be improved to 88.6%.

In the rectangular smoothing lifter of the embodiment of FIG. 1, the dynamic cepstrum coefficients of the order not lower than the initial cutoff quefrency $q_0$ are the same as the original cepstrum coefficients. A method employing a lifter having Gaussian distribution may be proposed as a method by which masking can be taken into consideration even for higher order coefficients. If the lifter is in the form of Gaussian distribution, the impulse response of the spectrum smoothing filter on the frequency axis obtained by Fourier transform thereof is also in the form of Gaussian distribution. The k-th coefficient of the Gaussian lifter for smoothing the spectrum before n time points is provided as:

$$l_k(n) = \alpha\beta^{n-1}\exp\left(-\frac{k^2}{2(q_0 - v(n-1))^2}\right) \quad (4)$$

In the Gaussian type smoothing lifter, $q_0$ provides standard deviation of Gaussian distribution of the smoothing lifter at one time point before. The standard deviation of Gaussian distribution becomes smaller linearly as the time is traced back.

Figure 2:
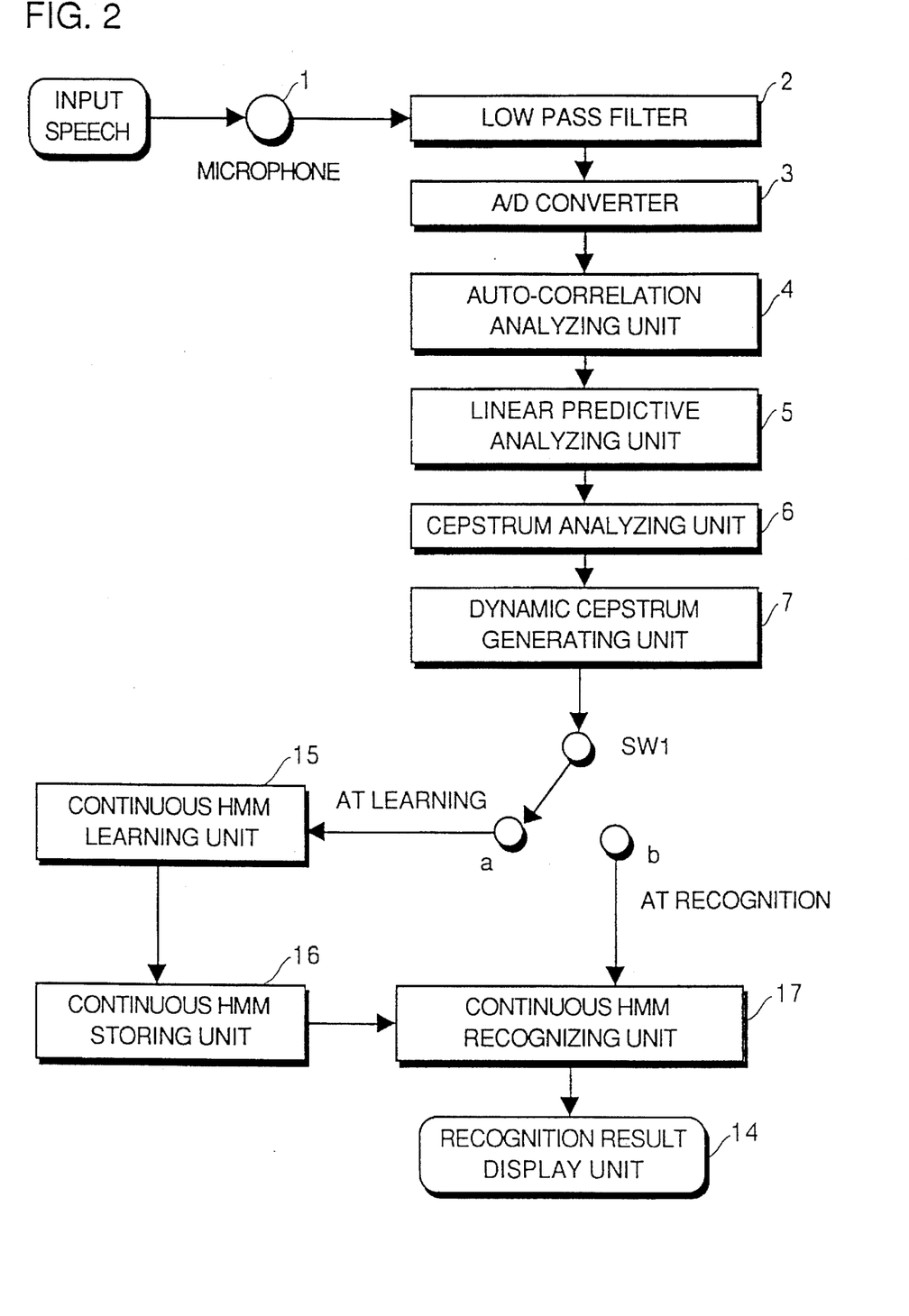
FIG. 2 is a block diagram showing a structure of another embodiment of the present invention.

FIG. 2 shows another embodiment of the present invention. In the example of FIG. 2, continuous HMMs is used as the recognizing unit [Peter F. Brown, "The Acoustic-Modeling Problem in Automatic Speech Recognition," Ph. D thesis, Carnegie-Mellon University (1987)]. A method employing a Gaussian type rectangular window and continuous HMMs in the recognizing unit, and the result of experiment will be described with reference to the embodiment of FIG. 2. Structures from microphone 1 to the dynamic cepstrum generating unit 7 are the same as those shown in FIG. 1. A Gaussian type smoothing lifter is used in dynamic cepstrum generating unit 7. Both rectangular type and Gaussian type smoothing windows can be used in the dynamic cepstrum generating unit 7 both in the embodiments of FIGS. 1 and 2.

The parameters of the Gaussian type smoothing lifter are set to N=4, initial standard deviation $q_{0=}18$, standard deviation reduction rate $v=1$, $\alpha=0.3$ and $\beta=0.7$. Since continuous HMMs are used in the example of FIG. 2, units related to vector quantization are not necessary. Therefore, the dynamic cepstrum obtained in dynamic cepstrum generating unit 7 directly enters switch SW1. In learning HHM, switch SW1 is switched to the "a" side. The time sequence of the dynamic cepstrum enters the continuous HMM learning unit 15, and is learned as a continuous HMM having continuous output distribution represented by diagonal Gaussian mixture distribution state by state. The number of mixture of Gaussian distribution is, for example, 8. The learned phoneme recognition HMM is stored in a continuous HMM storing unit 16. When a testing speech is to be recognized, the switch SW1 is switched to the "b" side, recognition is carried out in the continuous HMM recognizing unit 17, and the result is displayed on recognition result display unit 14.

More specifically, the continuous HMM stored in the continuous HMM storing unit 16 represents not the probability of generation of vector codes as in discrete HMM but an output probability by a function indicative of the probability of generation of the vector itself. Generally, this probability of generation is represented by a mixture of Gaussian distributions. In the continuous HMM recognizing unit 17, model probability by the continuous HMM is calculated. It may be unnecessary to describe in detail the recognition method in accordance with HMM, as it is widely known. In summary, the method of obtaining probability of one HMM for an input speech is as follows. Every possible assignment without tracing back in time of the states of the HMM is carried out for a time sequence of the dynamic cepstrum vector of the input speech, the output probability of the dynamic cepstrum vector is multiplied by transition probability, the logarithm of the results are accumulated and the sum is regarded as probability of one HMM model for the input speech. Such probabilities of several HMM models such as /b/, /d/ and so on are calculated, and the model having the highest probability is regarded as the result of recognition. Though the unit of the HMM model is a phoneme in this embodiment, a word or a phrase may be used as the unit.

The reliability of dynamic cepstrum was evaluated by an experiment of phoneme recognition. The speech data base used included 5240 important Japanese words and 115 sentences uttered with a pause at every phrase uttered by ten males and ten females. The former will be referred to as word utterance data base, while the latter will be referred to as phrase utterance data base. For learning, 2640 words of word utterance data base were used, and testing phonemes were collected from the remaining 2640 words of the word utterance data base and from the phrase utterance data base. Recognition of 23 phonemes including 5 vowels and 18 consonants, that is, /b, d, g, m, n, N, p, t, k, s, h, z, r, y, w, ch, ts, sh, a, i, u, e, o/ was carried out.

An experiment of recognizing 23 phonemes of speeches of ten males and ten females was carried out, and average recognition rate of 20 speakers was calculated. As a result, compared with the example using cepstrum coefficients, by utilizing dynamic cepstrum, the recognition rate could be improved from 93.9% to 95.4% when the word utterance data base was used, and the rate could be improved from 77.3% to 82.5% when phrase utterance data base was used. From this result, it can be understood that the dynamic cepstrum is robust not only for speeches of similar utterance style but also to speeches of different utterance styles.

In the third embodiment, the present invention is implemented not in the cepstral domain but by an equivalent operation in a logarithmic spectrum domain. The principle will be described. The speech is converted to a spectrum time sequence by Fourier transform or the like. An operation for frequency smoothing the spectrum corresponds to a convolution between the spectrum and the smoothing filter on the frequency axis. When logarithmic spectrum of the speech at the present time point i is represented as $S(\omega, i)$ and the filter for smoothing the logarithmic spectrum n time point before is represented as $h(\lambda, n)$, the masking pattern $M(\omega, i)$ at present time i can be represented as a total sum of the logarithmic spectra smoothed over N time points in the past, as $$M(\omega,i) = \sum_{n=1}^{N} \int_{-\infty}^{\infty} S(\omega - \lambda, i - n) h(\lambda, n) d\lambda \qquad (5)$$

N represents the maximum time period in which masking is effective. The masked effective auditory speech spectrum can be obtained by subtracting the masking pattern from the logarithmic spectrum at present, that is, $$P(\omega, i) = S(\omega, i) - M(\omega, i) \qquad (6)$$

This parameter will be referred to as a masked spectrum. Here, $h(\lambda, n)$ is obtained by Fourier transform of the frequency smoothing lifter $l_k(n)$ of the embodiment 1 or 2.

A time sequence of masked spectrum is generated when the above described operation is successively carried out for respective time points of the speech from the past. Speech recognition is carried out by using the time sequence. The recognition method may utilize template matching using dynamic programing (or a method using DTW: Dynamic Time-Warping), or a method using HMM (Hidden Markov Model). The embodiment in accordance with this principle will be described. In this embodiment, dynamic time-warping is used in the recognizing unit.

Figure 3:
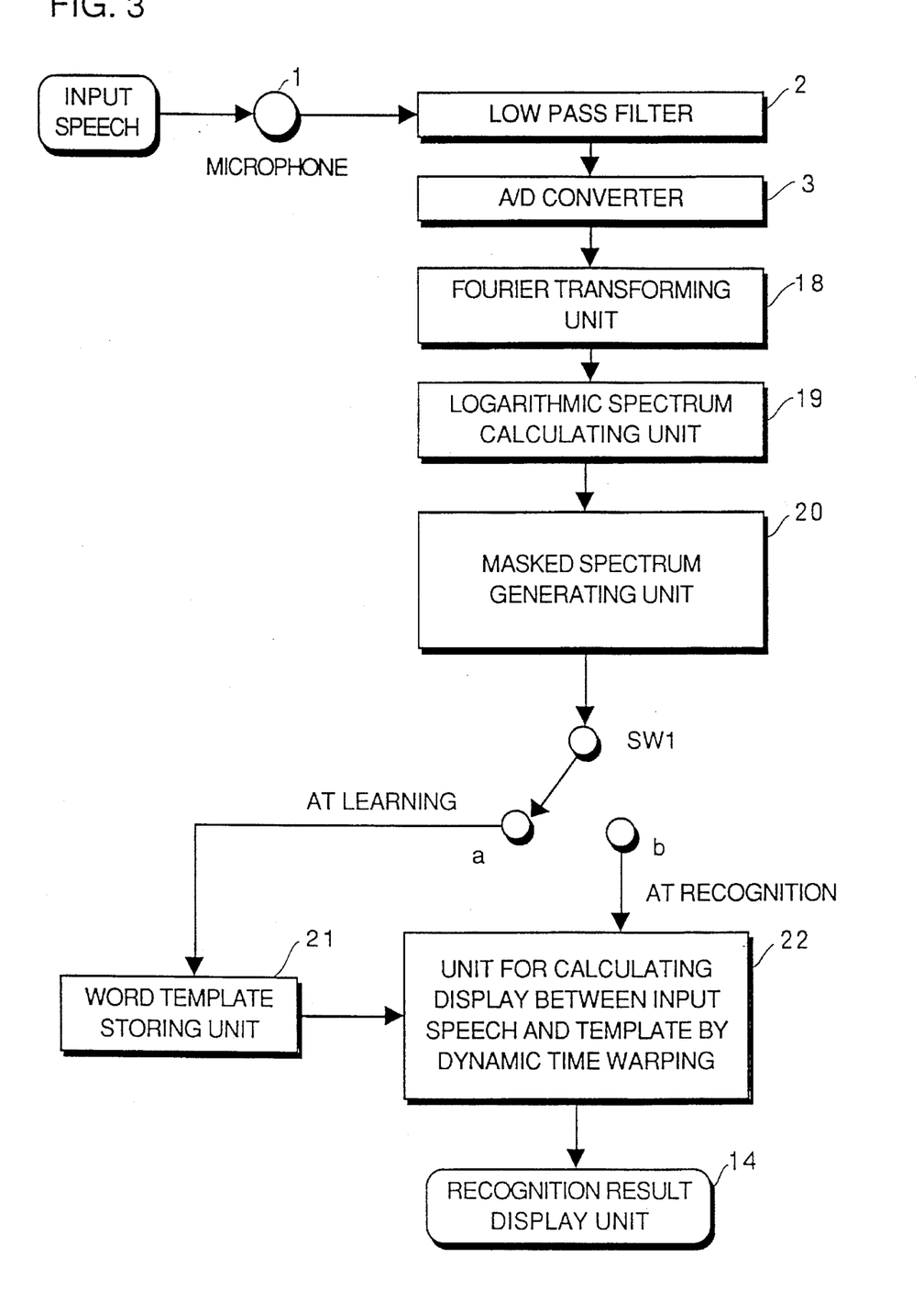
FIG. 3 is a block diagram showing a structure of a still further embodiment of the present invention.

FIG. 3 is a block diagram showing a further embodiment for recognizing words in accordance with the present invention. An input speech is converted to an electric signal by a microphone 1, its frequency component not lower than ½ of the sampling frequency is removed by a low pass filter 2, and the signal is applied to an A/D converter 3. The A/D converter 3 has a sampling frequency, for example, of 12 kHz and quantization level of 16 bits, and the signal is converted to a digital signal. The digital signal is applied to a Fourier transforming unit 18, speech portions are segmented by a hamming window having the width of 21.3 msec at every 10 msec, and spectra of 128 orders are obtained. A logarithmic spectrum calculating unit 19 provides a logarithm by root mean square of four frequencies by four frequencies, so that the spectra are converted to logarithmic spectra having 32 frequency points.

Masked spectrum generating unit 20 provides a time frequency masking filter of the logarithmic spectrum time sequence to provide a time sequence of the masked spectrum. The time frequency masking filter is obtained by Fourier transform of the masking lifter for the dynamic cepstrum of the embodiment 1 or 2.

A switch SW1 is for switching between template learning and recognition. When it is switched to the "a" side, one or multiple word training samples are collected and transmitted to a word template storing unit 21. In this embodiment, dynamic time warping or dynamic programming matching is used, and therefore training speech is not subjected to any statistical processing but directly stored in the word template storing unit 21 [Hiroaki Sakoe and Seibi Chiba, "Dynamic Programming Algorithm optimization for Spoken Word Recognition," IEEE Trans. on Acoustics. Speech, and Signal Processing, Vol. ASSP-26, No. 1, 1978-Feb.].

Since the embodiment 3 is directed to an apparatus for recognizing words, the templates are stored on word by word basis. Such templates are prepared corresponding to the categories to be recognized. At the time of recognition, switch SW1 is switched to the "b" side, and at a distance calculating unit 22, the distance between the input speech and the templates of all words stored is calculated by dynamic programming matching. More specifically, time axis of the input speech, of the template or both are warped at every time point, and average value, in the entire speech, of the distances between corresponding points of both speeches where these two are best matched is regarded as the distance between the input speech and the template. The distance calculating unit 22 compares the distance between the input speech and every template, and displays the name of the word template indicating the minimum distance, /word/, for examples, as a result of recognition at the recognition result display unit 14. This method can be applied to phoneme recognition and the like in addition to word recognition.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A speech recognition method in which an input speech in converted to a time sequence of a feature vector, said feature vector including one of a spectrum and a cepstrum, and a distance or probability between the input speech time sequence and a time sequence of the feature vector or a statistical model thereof, is calculated for recognition, comprising the steps of:

effecting a time frequency masking by an operation of obtaining a masked speech spectrum by subtracting, from speech spectrum at present, a masking pattern which is a function of frequency obtained by smoothing immediately preceding speech spectrum by time and frequency; and recognizing the speech by using the masked speech spectrum obtained by the above described operation at every time point.

2. A speech recognition method, comprising the steps of:

converting an input speech to a digitized speech signal;

converting said digitized speech signal to cepstrum coefficients at every prescribed time interval;

obtaining a time sequence of dynamic cepstrum by subtracting a masking pattern from an input speech cepstrum at present; and recognizing the speech by using said dynamic cepstrum.

3. The speech recognition method according to claim 2, wherein said step of converting to said cepstrum coefficients includes the steps of:

segmenting said digitized speech signal at every prescribed time interval and obtaining an auto-correlation coefficient vector; and calculating a linear predictive coefficient vector based on said auto-correlation coefficient vector.

4. The speech recognition method according to claim 2, wherein said step of converting to said cepstrum coefficients includes the step of segmenting said digitized speech signal at every prescribed time interval and obtaining a logarithmic spectrum by Fourier transform and calculating a cepstrum coefficient vector by inverse Fourier transform of the logarithmic spectrum.

5. The speech recognition method according to claim 2, wherein said step of recognizing the speech includes the steps of:

assigning the closest one of the centroid vectors obtained from a number of training samples of dynamic cepstrum vectors to the time sequence of centroid vectors of said dynamic cepstrum for an input speech, to generate a sequence of vector code numbers; and recognizing said sequence of vector code numbers.

6. The speech recognition method according to claim 5, further comprising the step of:

collecting training samples represented by said sequence of vector code numbers and learning the same in accordance with a prescribed algorithm; wherein said step of generating said sequence of vector code numbers includes the step of recognizing a sequence of vector code numbers of the input speech to be recognized, based on the result of learning in accordance with said prescribed algorithm.

7. The speech recognition method according to claim 6, wherein said step of learning includes the step of learning by using Hidden Markov Models.

8. The speech recognition method according to claim 2, wherein said step of recognizing an input speech sound includes the step of learning the probability of the spectral features of training speed units including phenomes or words.

9. The speech recognition method according to claim 8, wherein said step of recognizing the speech includes the step of recognizing the input speech represented by the dynamic cepstrum time sequence by using the result of said learning.

10. A speech recognition method, comprising the steps of:

converting an input speech to a digitized speech signal;

segmenting said digitized speech signal at every prescribed time interval in order to obtain a logarithmic spectrum time sequence by Fourier transform;

effecting a time frequency masking by an operation of obtaining masked speech spectrum by subtracting, from speech spectrum at present, a masking pattern which is a function of frequency obtained by smoothing immediately preceding speech spectrum by time and frequency for obtaining a masked spectrum time sequence; and recognizing the speech by using said masked spectrum time sequence.

11. The speech recognition method according to claim 10, wherein said step of recognizing the speech includes the step of recognizing the speech by calculating a feature vector representing the same content as a dynamic cepstrum including said masked spectrum.

12. The speech recognition method according to claim 11, wherein said step of recognizing the input speech includes the step of recognizing the speech by a method of dynamic time warping.

13. The speech recognition method according to claim 11, wherein said step of recognizing the input speech includes the steps of:

storing as a template, typical speech sound of a word to be recognized as it is, or storing as a template, an average of a plurality of typical speech sounds of the word to be recognized; and calculating a distance between said registered word template and the time sequence of said masked spectrum of the input speech to be recognized by dynamic time warping, and recognizing the speech based on this distance.

* * * * *

UNITED STATES PATENT AND TRADEMARK OFFICE
CERTIFICATE OF CORRECTION

PATENT NO. : 5,459,815
DATED : Oct. 17, 1995
INVENTOR(S) : Kiyoaki AIKAWA

It is certified that error appears in the above-identified patent and that said Letters Patent is hereby corrected as shown below:

Please delete columns 1 - 12 and substitute columns 1 - 12 as per attached.

Signed and Sealed this

Fifteenth Day of April, 1997

Attest:

BRUCE LEHMAN

Attesting Officer     Commissioner of Patents and Trademarks

SPEECH RECOGNITION METHOD USING TIME-FREQUENCY MASKING MECHANISM

BACKGROUND OF THE INVENTION

1. Field of the Invention

The present invention relates to a speech recognition method. More specifically, the present invention relates to a speech recognition method in which automatic speech recognition by a machine such as electronic computer is effected by using distance or probability between an input speech spectrum time sequence and a template speech spectrum time sequence or its statistical model.

2. Description of the Background Art

Basically, in automatic speech recognition by an electronic computer or the like, the speech is converted to a spectrum time sequence and recognized. Cepstrum is often used as a feature parameter representing the spectrum. The cepstrum is defined as an inverse Fourier transform of the logarithmic spectrum. In the following, logarithmic spectrum will be simply referred to as a spectrum.

Recently, it has been reported that the reliability of speech recognition can be improved if a change of the spectrum in time or on a frequency axis is used as a feature together with the spectrum. Proposed are "delta cepstrum" utilizing time change of the spectrum [Sadaoki Furui: "Speaker-Independent Isolated Word Recognition Using Dynamic Features of Speech Spectrum," IEEE Trans., ASSP-34, No. 1, pp. 52-59, (1986-2).]; a "spectral slope" utilizing frequency change of the spectrum [D. H. Klatt: "Prediction of Perceived Phonetic Distance from Critical-Band Spectra: A First Step," Proc. ICASSP82 (International Conference on Acoustics Speech and Signal Processing), pp. 1278-1281, (May, 1982), Brian A. Hanson and Hisashi Wakita: "Spectral Slope Distance Measures with Linear Prediction Analysis for Word Recognition in Noise," IEEE Trans. ASSP-35, No. 7, pp. 968-973, (Jul., 1987)]; and "spectral movement function" capturing the movement of formant [Kiyoaki Aikawa and Sadaoki Furui: "Spectral Movement Function and its Application to Speech Recognition," Proc. ICASSP88, pp. 223-226, (Apr., 1988)].

"Delta cepstrum" is based on a time-derivative of the logarithmic spectrum time sequence and calculated by a time filter which does not depend on frequency. "Spectral slope" is based on frequency-derivative of the logarithmic spectrum and is calculated by a time invariant frequency filter. "Spectral movement function" is based on a time-frequency-derivative of the logarithmic spectrum and is calculated by operations of both the time filter and the frequency filter. Here, the frequency filter is constant regardless of time, and the time filter is constant for every frequency. The time filter addresses fluctuation of the spectrum on the time axis, while the frequency filter addresses fluctuation of the spectrum on the frequency axis.

However, a feature extraction mechanism of the human auditory system is considered to be different from any of these filters. The human auditory system has a masking effect. In a two dimensional spectrum on a time frequency plane, a speech signal of a certain frequency at a certain time point is masked by a speech signal which is close in time and in frequency. In other words, it is inhibited. As for the masking effect, when the speech at a certain time point masks a speech succeeding in time, this effect is referred to as forward masking. We can consider that forward masking serves to store the spectral shape of a preceding time point, and therefore we can assume that a dynamic feature not included in the preceding speech is emphasized by this effect. According to an auditory-psychological study, frequency pattern of forward masking becomes smoother when a time interval between the masking sound and the masked sound (masker-signal time-interval) becomes longer [Eiichi Miyasaka, "Spatio-Temporal Characteristics of Masking of Brief Test-Tone Pulses by a Tone-Burst with Abrupt Switching Transients," J. Acoust. Soc. Jpn, Vol. 39, No. 9, pp. 614-623, 1983 (in Japanese)]. This masked speech is the effective speech perceived in the human auditory system. This signal processing mechanism can not be realized by a time-invariant frequency filter. In order to implement this signal processing mechanism, it is necessary to use a set of frequency filters the characteristics of which change dependent on time. The set of frequency filters have their characteristics as spectrum smoothing filters changed dependent on the time-interval between the current spectrum and the preceding spectrum serving as a masker and operation related to frequency is dependent on time-interval. A mechanism for extracting feature parameters taking into consideration such auditory characteristics has not yet been reported.

SUMMARY OF THE INVENTION

Therefore, an object of the present invention is to provide a method of speech recognition which can improve performance of automatic speech recognition by a machine, in which a spectrum time sequence closer to the actual spectrum time sequence perceived by a human being as compared with the conventional techniques, by using a spectrum smoothing filter having filtering characteristics dependent on a time-interval between the current spectrum and preceding spectrum which serves as a masker simulating time frequency characteristics of forward masking.

The present invention provides a speech recognition system in which input speech is converted to a time sequence of a feature vector such as spectrum or cepstrum, that is, spectra are obtained periodically. The time when a spectrum is obtained is called a time point and distance or probability of model between the resulting time sequence and a time sequence of a template spectrum feature vector, or its statistical model, is calculated for recognition. A set of frequency filters in which frequency smoothing is promoted as the time is traced back, including the promotion being stopped at a certain time period traced back, or a frequency filter having the above described mechanism described as a function of time, is provided in the spectrum time sequence to smooth the preceding spectrum. Alternatively an operation equivalent thereto is carried out on the feature vector. A masking pattern is obtained, by accumulating preceding smoothed spectra from a certain time point in the past to immediately before the present time, or an equivalent operation is performed on the feature vector. A masked spectrum is obtained, by a certain operation between the spectrum at the present time and the masking pattern. An equivalent operation is carried out between the feature vector representing spectrum and a feature vector representing the masked spectrum. The masked spectrum or a feature vector time sequence equivalent thereto which is obtained by the above described operation carried out at every time point is used for recognition.

In the speech recognition method in accordance with the present invention, dynamic feature can be emphasized like speech processing observed in the human auditory system. More specifically, a feature which has not appeared so far is emphasized while a feature which has continuously appeared is suppressed. Since the masking pattern is the weighted sum of the smoothed preceding spectra, the masking pattern has come to represent a global feature of preceding speech input, and the change therefrom represents the feature at each time point. By this method, the dynamic feature important in speech recognition can be extracted and, in addition, influence of stationary spectral tilt dependent on individuality included in the speech or of transmission characteristic in the speech signal transmitting system can be reduced. The delta cepstrum which is a dynamic feature parameter and conventionally used does not have information of a spectral shape, and therefore it must be used with other parameters such as cepstrum. However, since the dynamic cepstrum includes both instantaneous and transitional features of a spectrum, it is not necessary to use it with other parameters. Further, by using such a time frequency masking mechanism, a dynamic feature can be obtained based on the preceding smoothed spectrum, and therefore the dynamic feature can be extracted with less influence of detailed formant structure of the preceding phoneme.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a structure of one embodiment of the present invention.

FIG. 2 is a block diagram showing a structure of another embodiment of the present invention.

FIG. 3 is a block diagram showing a structure of a still further embodiment of the present invention.

DESCRIPTION OF THE PREFERRED EMBODIMENTS

First, the principle of the present invention will be described. In this invention, speech is converted to a time sequence of cepstrum coefficients. The cepstrum can be easily calculated by using linear predictive coding analysis (LPC) [J. D. Markel and A. H. Gray, Jr., "Linear Prediction of Speech", Springer-Verlag (Berlin Heidelberg New York, 1976)]. The operation for frequency smoothing the spectrum means calculating convolution of the spectrum and the smoothing filter on the frequency axis, and it is equivalently done by multiplying a cepstrum vector and a cepstral lifter. A cepstrum vector is calculated by inverse Fourier transform of the log spectrum. A cepstral lifter is calculated by inverse Fourier transform of the smoothing filter. Let us represent the k-th order cepstrum coefficient of the speech at the time point i as $c_k(i)$. When the k-th order coefficient of the lifter for smoothing the spectrum n time point before is represented as $l_k(n)$, the k-th order cepstrum expansion coefficient $m_k(i)$ of the masking pattern at the present time i can be represented as a total sum of the speech cepstrum weighted by the lifter for preceding N time points, by the following equation (1):

$$m_k(i) = \sum_{n=1}^{N} c_k(i - n) l_k(n) \quad (1)$$

N represents maximum time period in which masking is effective. The masked effective speech spectrum can be obtained by subtracting the masking pattern from the spectrum at present, and in the cepstral domain, the cepstrum expansion coefficient of the k-th order of the masked effective spectrum can be obtained by subtracting the cepstrum expansion coefficient of the masking pattern from the cepstrum at present, as represented by the following equation (2):

$$b_k(i) = c_k(i) - m_k(i) \quad (2)$$

This parameter is referred to as a "dynamic cepstrum."

The pass band of the frequency smoothing lifter $l_k(n)$ used herein is adapted to be narrower as the time n is further traced back from the present time, with the quefrency of 0th order being the center. In a first embodiment, a rectangular window is used for the shape of the lifter, which is represented by the following equation (3):

$$l_k(n) = \begin{cases} \alpha \beta^{n-1} & |k| \leq q_0 - \nu(n - 1) \\ 0 & \text{otherwise} \end{cases} \quad (3)$$

Here, $q_0$ represents cutoff quefrency one time point before the present, and $\nu$ represents the rate of narrowing of the quefrency pass band at every advance of time by one frame. The influence of the preceding speech as a masking pattern on the present speech decays exponentially, with the initial masking decay rate being $0 < \alpha < 1$ and medial masking decay rate being $0 < \beta < 1$.

A time sequence of dynamic cepstrum is generated by the above described operation carried out successively for the speech at respective time points from the past. Speech recognition is carried out by using the time sequence of the produced dynamic cepstrum series. The recognition method may employ template matching using dynamic programming, DTW (Dynamic Time-Warping) or HMM (Hidden Markov Model). Since the dynamic cepstrum is obtained from the speech spectra of the past and present and does not use future spectrum, it is convenient also for a speech recognition apparatus carrying out time-synchronous processing. The embodiments in accordance with the principle will be described in the following.

FIG. 1 is a block diagram of a first embodiment of the present invention. Input speech is converted to an electric signal, its frequency component not lower than the ½ of the sampling frequency is removed by a low pass filter 2, and the signal is applied to an A/D converter 3. A/D converter 3 has a sampling frequency, for example, of 12 kHz and a quantization level of 16 bits, and by this converter, the signal is converted to a digital signal. The digital signal is applied to an auto-correlation analyzing unit 4, a sequence of speech segment are produced using a Hamming window having the width of 30 msec at every 10 msec, and auto-correlation coefficients from first to 16th order are calculated. In this case the time point interal is 10 msec. A linear predictive coefficient analyzing unit 5 calculates linear predictive coefficients of first to 16th order from the auto-correlation coefficients, and a cepstrum analyzing unit 6 calculates cepstrum coefficients of first to 16th order. Meanwhile, before linear predictive analysis, pre-emphasizing for emphasizing high frequency component of the speech is effected by performing, for example, a differential filtering on the speech wave.

A dynamic cepstrum generating unit 7 provides a time frequency masking on the cepstrum time sequence to obtain a time sequence of dynamic cepstrum. Respective coefficients of the masking lifter are set to $q_0=7$, $\alpha=0.25$, $\beta=0.5$, $\nu=1$ and $N=4$. The coefficients of the masking lifter of k-th order at the time delay of n are as shown in Table 1 below.

TABLE 1

Coefficients of Square Spectrum Smoothing Lifter

| Order | Time Delay | | | | |
|---|---|---|---|---|---|
| | 1 | 2 | 3 | 4 | 5 |
| 1 | 0.25 | 0.125 | 0.0625 | 0.0313 | 0 |
| 2 | 0.25 | 0.125 | 0.0625 | 0.0131 | 0 |
| 3 | 0.25 | 0.125 | 0.0625 | 0.0313 | 0 |
| 4 | 0.25 | 0.125 | 0.0625 | 0.0313 | 0 |
| 5 | 0.25 | 0.125 | 0.0625 | 0 | |
| 6 | 0.25 | 0.125 | 0 | | |
| 7 | 0.25 | 0 | | | |
| : | 0 | | | | |
| 16 | 0 | | | | |

In this embodiment, a discrete HMM using an output probability of a representative vector code is used, and therefore a step of vector quantization is necessary [Y. Linde, A. Buzo, and R. M. Gray, "An algorithm for vector quantizer design," IEEE Trans. Commun., vol. COM-28, pp.84–95, (Jan-1980)].

A switch SW1 is switched for obtaining representative points of a vector, that is, a centroid, from a number of the samples of feature vector in a prescribed time period. When switch SW1 is switched to the "a" side, a number of samples of the dynamic cepstrum obtained in the dynamic cepstrum generating unit 7 are applied to a centroid generating unit 8, and centroid vectors of 256 dynamic cepstra can be obtained by vector quantization. Centroid vectors are stored in a codebook storing unit 9. When switch SW1 is switched to the "b" side, a vector quantizing unit 10 assigns a centroid vector closest to respective vectors of the dynamic cepstrum time sequence of the speech by using about 256 centroid vectors stored in the codebook storing unit 9, and the speech is represented by a sequence of vector code number. Closeness between the centroid and each vector can be measured by a measure such as Euclidean distance.

A switch SW2 is for switching between HMM learning and recognition of test speech. When it is switched to the "a" side, a number of phoneme training samples are collected in an HMM training unit 11, and learned in accordance with Baum-Welch learning algorithm [L. E. Baum, "An Inequality and Associated Maximization Technique in Statistical Estimation for Probabilistic Functions of a Markov Process," Inequalities, 3, pp.-8, 1972]. As the embodiment 1 is directed to an apparatus for recognizing phonemes, HMM learns on a phoneme by phoneme basis. For example, HMM for recognizing the phoneme /b/ is learned from a number of samples of /b/. The phoneme training sample is a sequence of vector codes. The length of sequence is variable. A typical 4-state 3-loop HMM, for example, is used for representing a phoneme. The obtained HMMs are stored in an HMM storing unit 12. Such HMMs are prepared corresponding to categories to be recognized. At the time of recognition, switch SW2 is switched to the "b" side, and the sequence of vector codes of the testing speech is recognized by the HMMs at an HMM recognizing unit 13. There is a table of probability (output probability) of centroid numbers (vector codes) for each state (a code 1 at state 1 is described, for example, as having a probability of 0.01), and the table is learned based on the set of training speeches. Probability of transition from one state to another is also learned.

In HMM recognizing unit 13, an HMM model of /b/, an HMM model of /d/ and so on are successively examined for an input speech represented as a time sequence of vector codes, and probability of generation of vector code time sequence of the input speech is calculated. It may be unnecessary to describe in detail the recognition method using HMM, as it is well known. In summary, a method of calculating probability of one HMM with respect to the input speech is as follows. Every possible assignment without tracing back of time of HMM states is carried out for the vector code time sequence of the input speech, the generation probability of the vector code is multiplied by a state transition probability, and the logarithm of the results are accumulated to obtain a probability indicative of the distance between the model and the input speech. Such probabilities of several HMM models such as /b/, /d/ and the like are calculated, and the model having the highest probability is regarded as the result of recognition, and the result is displayed on a recognition result display unit 14.

The result provided by one embodiment of the present invention was confirmed by an experiment of recognizing 6 phonemes /b, d, g, m, n, N/ using HMMs. Phoneme samples used for learning were extracted from 2640 Japanese important words uttered by one male. Phoneme samples used for testing were extracted from different 2640 important words uttered by the same person. According to the result of recognition experiment, recognition rate, which had been 84.1% when conventional cepstrum coefficients had been used as feature parameters, could be improved to 88.6%.

In the rectangular smoothing lifter of the embodiment of FIG. 1, the dynamic cepstrum coefficients of the order not lower than the initial cutoff quefrency $q_0$ are the same as the original cepstrum coefficients. A method employing a lifter having Gaussian distribution may be proposed as a method by which masking can be taken into consideration even for higher order coefficients. If the lifter is in the form of Gaussian distribution, the impulse response of the spectrum smoothing filter on the frequency axis obtained by Fourier transform thereof is also in the form of Gaussian distribution. The k-th coefficient of the Gaussian lifter for smoothing the spectrum before n time points is provided as:

$$l_k(n) = \alpha \beta^{n-1} \exp\left(-\frac{k^2}{2(q_0 - \nu(n-1))^2}\right) \quad (4)$$

In the Gaussian type smoothing lifter, $q_0$ provides standard deviation of Gaussian distribution of the smoothing lifter at one time point before. The standard deviation of Gaussian distribution becomes smaller linearly as the time is traced back.

FIG. 2 shows another embodiment of the present invention. In the example of FIG. 2, continuous HMMs is used as the recognizing unit [Peter F. Brown, "The Acoustic-Modeling Problem in Automatic Speech Recognition," Ph. D thesis, Carnegie-Mellon University (1987)]. A method employing a Gaussian window and continuous HMMs in the recognizing unit, and the result of experiment will be described with reference to the embodiment of FIG. 2. Structures from microphone 1 to the dynamic cepstrum generating unit 7 are the same as those shown in FIG. 1. A Gaussian type smoothing lifter is used in dynamic cepstrum generating unit 7. Both rectangular type and Gaussian type smoothing windows can be used in the dynamic cepstrum generating unit 7 both in the embodiments of FIGS. 1 and 2.

The parameters of the Gaussian type smoothing lifter are set to N=4, initial standard deviation $q_0=18$, standard deviation reduction rate $\nu=1$, $\alpha=0.3$ and $\beta=0.7$. Since continuous HMMs are used in the example of FIG. 2, units related to vector quantization are not necessary. Therefore, the dynamic cepstrum obtained in dynamic cepstrum generating unit 7 directly enters switch SW1. In learning HHM, switch SW1 is switched to the "a" side. The time sequence of the dynamic cepstrum enters the continuous HMM learning unit 15, and is learned as a continuous HMM having continuous output distribution represented by diagonal Gaussian mixture distribution state by state. The number of mixture of Gaussian distribution is, for example, 8. The learned phoneme recognition HMM is stored in a continuous HMM storing unit 16. When a testing speech is to be recognized, the switch SW1 is switched to the "b" side, recognition is carried out in the continuous HMM recognizing unit 17, and the result is displayed on recognition result display unit 14.

More specifically, the continuous HMM stored in the continuous HMM storing unit 16 represents not the probability of generation of vector codes as in discrete HMM but an output probability by a function indicative of the probability of generation of the vector itself. Generally, this probability of generation is represented by a mixture of Gaussian distributions. In the continuous HMM recognizing unit 17, model probability by the continuous HMM is calculated. It may be unnecessary to describe in detail the recognition method in accordance with HMM, as it is widely known. In summary, the method of obtaining probability of one HMM for an input speech is as follows. Every possible assignment without tracing back in time of the states of the HMM is carried out for a time sequence of the dynamic cepstrum vector of the input speech, the output probability of the dynamic cepstrum vector is multiplied by transition probability, the logarithm of the results are accumulated and the sum is regarded as probability of one HMM model for the input speech. Such probabilities of several HMM models such as /b/, /d/ and so on are calculated, and the model having the highest probability is regarded as the result of recognition. Though the unit of the HMM model is a phoneme in this embodiment, a word or a phrase may be used as the unit.

The reliability of dynamic cepstrum was evaluated by an experiment of phoneme recognition. The speech data base used included 5240 important Japanese words and 115 sentences uttered with a pause at every phrase uttered by ten males and ten females. The former will be referred to as word utterance database while the latter will be referred to as phrase utterance data base. For learning, 2640 words of word utterance database were used, and testing phonemes were collected from the remaining 2640 words of the word utterance data base and from the phrase utterance database. Recognition of 23 phonemes including 5 vowels and 18 consonants, that is, /b, d, g, m, n, N, p, t, k, s, h, z, r, y, w, ch, ts, sh, a, i, u, e, o/ was carried out.

An experiment of recognizing 23 phonemes of speech data of ten males and ten females was carried out, and average recognition rate of 20 speakers was calculated. As a result, compared with the example using cepstrum coefficients, by utilizing dynamic cepstrum, the recognition rate could be improved from 93.9% to 95.4% when the word utterance data base was used, and the rate could be improved from 77.3% to 82.5% when phrase utterance database was used. From this result, it can be understood that the dynamic cepstrum is robust not only for speech data of similar utterance style but also to speech data of different utterance styles.

In the third embodiment, the present invention is implemented not in the cepstral domain but by an equivalent operation in a logarithmic spectrum domain. The principle will be described. The speech is converted to a spectrum time sequence by Fourier transform or the like. An operation for frequency smoothing the spectrum corresponds to a convolution between the spectrum and the smoothing filter on the frequency axis. When logarithmic spectrum of the speech at the present time point i is represented as $S(\omega, i)$ and the filter for smoothing the logarithmic spectrum n time point before is represented as $h(\lambda, n)$, the masking pattern $M(\omega, i)$ at present time i can be represented as a total sum of the logarithmic spectra smoothed over N time points in the past, as $$M(\omega,i) = \sum_{n=1}^{N} \int_{-\infty}^{\infty} S(\omega - \lambda, i - n)h(\lambda,n)d\lambda \qquad (5)$$

N represents the maximum time period in which masking is effective. The masked effective auditory speech spectrum can be obtained by subtracting the masking pattern from the logarithmic spectrum at present, that is, $$P(\omega, i) = S(\omega, i) - M(\omega, i) \qquad (6)$$

This parameter will be referred to as a masked spectrum. Here, $h(\lambda, n)$ is obtained by Fourier transform of the frequency smoothing lifter $l_k(n)$ of the embodiment 1 or 2.

A time sequence of masked spectrum is generated when the above described operation is successively carried out for respective time points of the speech from the past. Speech recognition is carried out by using the time sequence. The recognition method may utilize template matching using dynamic programing (or a method using DTW: Dynamic Time-Warping), or a method using HMM (Hidden Markov Model). The embodiment in accordance with this principle will be described. In this embodiment, dynamic time-warping is used in the recognizing unit.

FIG. 3 is a block diagram showing a further embodiment for recognizing words in accordance with the present invention. An input speech is converted to an electric signal by a microphone 1, its frequency component not lower than ½ of the sampling frequency is removed by a low pass filter 2, and the signal is applied to an A/D converter 3. The A/D converter 3 has a sampling frequency, for example, of 12 kHz and quantization level of 16 bits, and the signal is converted to a digital signal. The digital signal is applied to a Fourier transforming unit 18, speech portions are segmented by a Hamming window having the width of 21.3 msec at every 10 msec, and spectra of 128 orders are obtained. A logarithmic spectrum calculating unit 19 provides a logarithm by root mean square of four frequencies by four frequencies, so that the spectra are converted to logarithmic spectra having 32 frequency points.

Masked spectrum generating unit 20 provides a time frequency masking filter of the logarithmic spectrum time sequence to provide a time sequence of the masked spectrum. The time frequency masking filter is obtained by Fourier transform of the masking lifter for the dynamic cepstrum of the embodiment 1 or 2.

A switch SW1 is for switching between template learning and recognition. When it is switched to the "a" side, one or multiple word training samples are collected and transmitted to a word template storing unit 21. In this embodiment, dynamic time warping or dynamic programming matching is used, and therefore training speech is not subjected to any statistical processing but directly stored in the word template storing unit 21 [Hiroaki Sakoe and Seibi Chiba, "Dynamic Programming Algorithm optimization for Spoken Word Recognition," IEEE Trans. on Acoustics. Speech, and Signal Processing, Vol. ASSP-26, No. 1, 1978-Feb.].

Since the embodiment 3 is directed to an apparatus for recognizing words, the templates are stored on word by word basis. Such templates are prepared corresponding to the categories to be recognized. At the time of recognition, switch SW1 is switched to the "b" side, and at a distance calculating unit 22, the distance between the input speech and the templates of all words stored is calculated by dynamic programming matching. More specifically, time axis of the input speech, of the template or both are warped at every time point, and average value, in the entire speech, of the distances between corresponding points of both speeches where these two are best matched is regarded as the distance between the input speech and the template. The distance calculating unit 22 compares the distance between the input speech and every template, and displays the name of the word template indicating the minimum distance, /word/, for examples, as a result of recognition at the recognition result display unit 14. This method can be applied to phoneme recognition and the like in addition to word recognition.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A speech recognition method in which an input speech is converted to a time sequence of a feature vector, said feature vector including a spectrum or a cepstrum, and a distance or probability between the input speech time sequence and a time sequence of a template speech time sequence or its statistical model is calculated for recognition, comprising the steps of:

effecting a time frequency masking by an operation of obtaining a masked speech spectrum by subtracting, from speech spectrum at present, a masking pattern defined on the frequency axis obtained by smoothing immediately preceding speech spectrum by time and frequency, and recognizing the speech represented, said step of recognizing including the step of using the masked speech spectrum obtained by the above described operation at every time point.

2. A speech recognition method, comprising the steps of:

converting an input speech to a digitized speech signal;

converting said digitized speech signal to cepstrum coefficients at every prescribed time interval;

obtaining a time sequence of dynamic cepstrum by subtracting a masking pattern from an input speech cepstrum at present; and recognizing the speech by using said dynamic cepstrum.

3. The speech recognition method according to claim 2, wherein said step of converting to said cepstrum coefficients includes the steps of:

segmenting said digitized speech signal at every prescribed time interval and obtaining an auto-correlation coefficient vector; and calculating a linear predictive coefficient vector based on said auto-correlation coefficient vector.

4. The speech recognition method according to claim 2, wherein said step of converting to said cepstrum coefficients includes the step of segmenting said digitized speech signal at every prescribed time interval and obtaining a logarithmic spectrum by Fourier transform and calculating a cepstrum coefficient vector by inverse Fourier transform of the logarithmic spectrum.

5. The speech recognition method according to claim 2, wherein said step of recognizing the speech includes the steps of:

assigning the closest one of the centroid vectors obtained from a number of training samples of dynamic cepstrum vectors to the time sequence of centroid vectors of said dynamic cepstrum for an input speech, to generate a sequence of vector code numbers; and recognizing said sequence of vector code numbers.

6. The speech recognition method according to claim 5, further comprising the step of:

collecting training samples represented by said sequence of vector code numbers and learning the same in accordance with a prescribed algorithm; wherein said step of generating said sequence of vector code numbers includes the step of recognizing a sequence of vector code numbers of the input speech to be recognized, based on the result of learning in accordance with said prescribed algorithm.

7. The speech recognition method according to claim 6, wherein said step of learning includes the step of learning by using Hidden Markov Models.

8. The speech recognition method according to claim 2, wherein said step of recognizing an input speech sound includes the step of learning the probability of the spectral features of training speech units including phenomes or words.

9. The speech recognition method according to claim 8, wherein said step of recognizing the speech includes the step of recognizing the input speech represented by the dynamic cepstrum time sequence by using the result of said learning.

10. A speech recognition method, comprising the steps of:

converting an input speech to a digitized speech signal;

segmenting said digitized speech signal at every prescribed time interval in order to obtain a logarithmic spectrum time sequence by Fourier transform;

effecting a time frequency masking by an operation of obtaining masked speech spectrum by subtracting, from speech spectrum at present, a masking pattern defined on the frequency axis obtained by smoothing immediately preceding speech spectrum by time and frequency for obtaining a masked spectrum time sequence; and recognizing the speech represented, said step of recognizing including the step of using said masked spectrum time sequence.

11. The speech recognition method according to claim 10, wherein
said step of recognizing said masked spectrum time sequence includes the steps of:

calculating the distance between the input speech and a template, said input speech and said template being represented by a masked spectrum, and displaying the name of a word template displaying the minimum distance.

12. The speech recognition method according to claim 11, wherein
said step of recognizing the input speech includes the step of recognizing the speech by a method of dynamic time warping.

13. The speech recognition method according to claim 11, wherein
said step of recognizing the input speech includes the steps of:

storing as a template, typical speech sound of a word to be recognized as it is, or storing as a template, an average of a plurality of typical speech sounds of the word to be recognized; and calculating a distance between said registered word template and the time sequence of said masked spectrum of the input speech to be recognized by dynamic time warping, and recognizing the speech based on this distance.

* * * * *